US 6,736,182 B2

(12) United States Patent
Smith et al.

(10) Patent No.: US 6,736,182 B2
(45) Date of Patent: May 18, 2004

(54) CRIMPER ASSEMBLY FOR SEALING OVERLAPPING PORTIONS OF A SHEET OF PACKAGING MATERIAL

(75) Inventors: Larry E. Smith, Perrysburg, OH (US); Louis M. Montano, Oak Harbor, OH (US)

(73) Assignee: Lako Tool & Manufacturing, Inc., Perrysburg, OH (US)

( * ) Notice: Subject to any disclaimer, the term of this patent is extended or adjusted under 35 U.S.C. 154(b) by 0 days.

(21) Appl. No.: 10/385,290

(22) Filed: Mar. 10, 2003

(65) Prior Publication Data

US 2003/0230387 A1 Dec. 18, 2003

Related U.S. Application Data

(60) Provisional application No. 60/363,379, filed on Mar. 11, 2002.

(51) Int. Cl.[7] .............................................. B32B 31/00
(52) U.S. Cl. ..................... 156/581; 156/582; 156/515; 156/530; 156/251; 493/194
(58) Field of Search ............................... 156/251, 515, 156/581, 582, 583.1, 530, 290; 53/450, 550, 376.2, 374.4, 374.2; 493/205–209, 194, 430; 100/152

(56) References Cited

U.S. PATENT DOCUMENTS 5,868,901 A * 2/1999 Smith ...................... 156/582

* cited by examiner

Primary Examiner—Richard Crispino
Assistant Examiner—Michelle Acevedo Lazor
(74) Attorney, Agent, or Firm—MacMillan, Sobanski & Todd, LLC

(57) ABSTRACT

A crimper assembly forms end seals in overlapping portions of the sheet of packaging material after being folded about an article. The crimper assembly includes a crimper including a base, an insert that is formed from a resilient material, and a support plate that is formed from a rigid material. The insert has a surface that is adapted to engage and seal overlapping layers of a packaging material. The insert is disposed between the base and the support plate. The support plate is secured to the body to retain and support the insert thereon. The insert and the support plate may be formed as separate pieces or may be secured together as a single piece. To prevent excessive compression of the insert, the insert can have an aperture formed therethrough, and the support plate can have a protrusion formed thereon that extends through the aperture into abutment with the base. Alternatively, the insert can include a pair of bushings, and such bushings are engaged between the base and the support plate to prevent excessive compression.

10 Claims, 9 Drawing Sheets

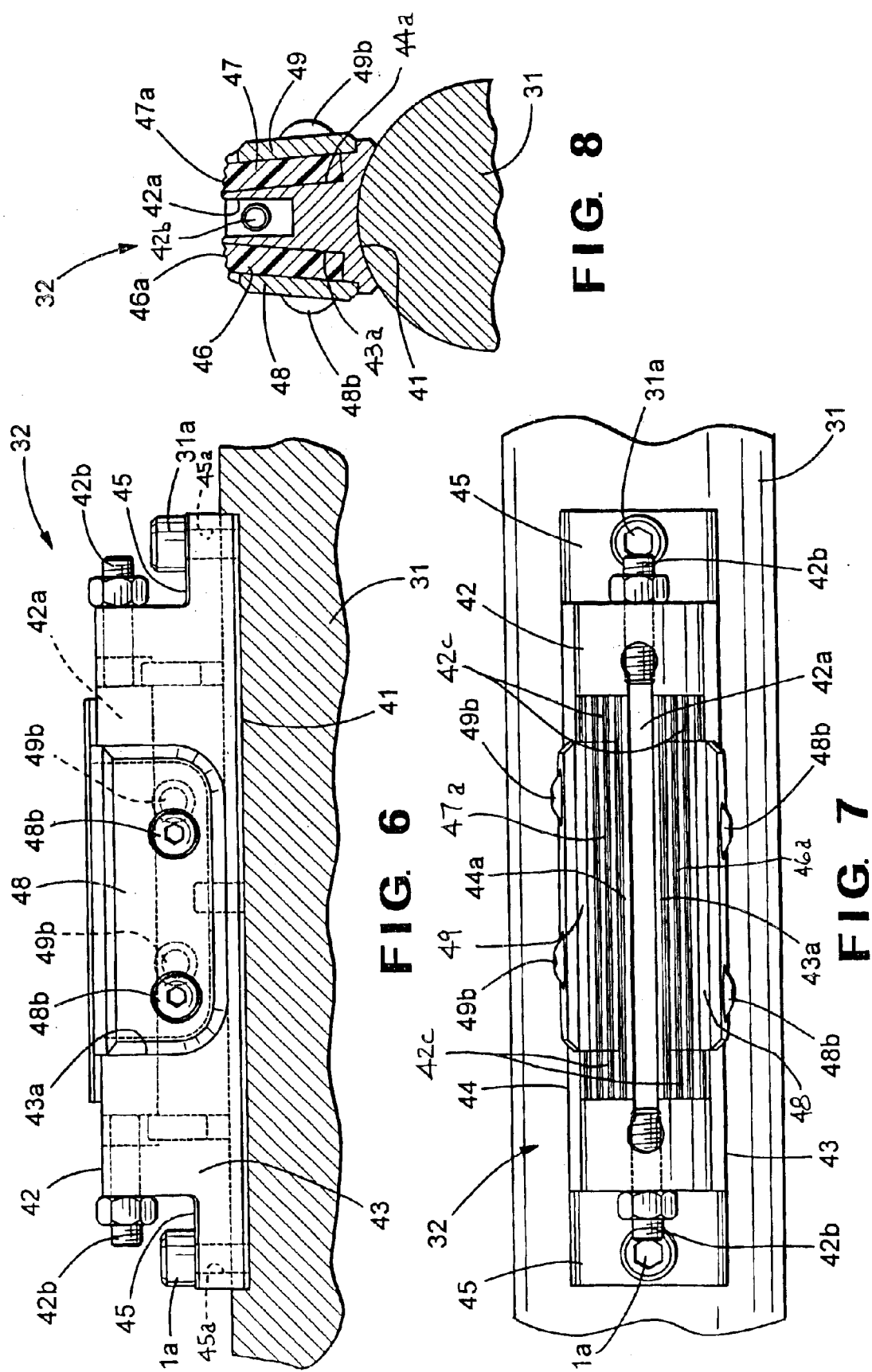

CRIMPER ASSEMBLY FOR SEALING OVERLAPPING PORTIONS OF A SHEET OF PACKAGING MATERIAL

CROSS REFERENCE TO RELATED APPLICATION

This application claims the benefit of U.S. Provisional Application No. 60/363,379, filed Mar. 11, 2002, the disclosure of which is incorporated herein by reference.

BACKGROUND OF THE INVENTION

This invention relates in general to form, fill, and seal packaging machinery of the type in which a continuous sheet of a packaging material is sequentially folded about a series of articles to be packaged, hot or cold sealed about the articles, and cut into individually sealed packages. More specifically, this invention pertains to an improved crimper assembly for forming end seals in overlapping portions of the sheet of packaging material after being folded about an article.

The formation of a plurality of individually sealed packages of articles using a single continuous sheet of a packaging material is well known in the art. Briefly, the sheet of packaging material is initially passed through a folding mechanism, which continuously folds the sheet over on itself to form an enclosure for a series of spaced apart articles. The overlapping portions of the sheet are then sealed along a continuous longitudinal seal. Next, the folded sheet of packaging material is fed to a sealing and cutting assembly, which seals the leading and trailing edges of the folded sheet of packaging material about the enclosed article and cuts the sealing leading and trailing edges so as to form a plurality of individually sealed packages. In some instances, it may be desirable to apply heat during the process of sealing the various overlapping portions of packaging material. Packages produced by this form, fill, and seal process are commonly used for snack bars, candy, cereals, and the like, as well as for other non-food articles.

The sealing of the overlapping end portions of the sheet of packaging material is frequently accomplished by a mechanical crimper assembly. A conventional mechanical crimper assembly includes a pair of opposed crimpers that are disposed on opposite sides of the overlapping portions of the sheet of packaging material. The crimpers are provided with respective undulating or serrated crimping surfaces that are defined by a series of adjacent peaks and valleys. When the opposed crimpers are moved into engagement with the overlapping portions of the sheet of packaging material, the peaks of the first crimping surface on a first one of the crimpers are aligned with the valleys of the second crimping surface on a second one of the crimpers, and vice versa. Such engagement compresses the overlapping portions of the sheet of packaging material to form an intermeshing seal pattern. In some instances, the sheet of packaging material is provided with a cohesive coating for accomplishing the seal when compressed. In other instances, an intermediate seal layer of a coating or other bonding material is provided.

During the crimping and sealing process, it is important that the crimpers exert a sufficient amount of force to compress the overlapping portions of the sheet of packaging material. If an insufficient amount of force is exerted by the crimpers, then the overlapping portions of the sheet of packaging material will not be sufficiently compressed to form a complete seal. At the same time, however, it is important that the amount of force exerted by the crimpers not exceed the strength of the sheet of packaging material. If an excessive amount of force is exerted by the crimpers, the sheet of packaging material will tear or break. Thus, it is desirable that the amount of force that is be exerted by the crimpers against the overlapping portions of the sheet of packaging material remain within a predetermined range to insure a complete and secure seal without causing damage thereto.

In a conventional crimper assembly, the crimpers and the crimping surfaces have been formed from a strong, rigid material, such as high strength steel. Although such crimpers have functioned satisfactorily in the past, several drawbacks have been noted. First, in order to insure that the amount of force exerted by the crimpers against the overlapping portions of the sheet of packaging material remains within the predetermined desired range, the initial set-up of the crimpers on the crimping assembly must be performed very carefully. This set-up operation is very time consuming. Unfortunately, because the set-up operation must usually be repeated whenever it is desired to change from one thickness of the sheet of packaging material to another, this arrangement has been found to be rather inefficient. Second, wrinkles that are occasionally present in the sheet of packaging material can cause additional overlapping portions to be compressed between the opposed crimpers. Because of the rigid nature of the crimpers, the presence of the wrinkles results in an excessive amount of force being applied to the overlapping portions of the sheet of packaging material. Third, in some packages, the number of overlapping layers of the sheet of packaging material varies from side to side. This can occur when the package being formed includes a longitudinally extending fin seal that is folded to one side. Each of the two end seals of the package would thus include a smaller thickness region (composed of only two overlapping portions of the sheet of packaging material) and a larger thickness region (composed of four overlapping portions of the sheet of packaging material). Similar varying thickness regions are found in packages containing conventional gusset folds and fin seals. It has been found to be quite difficult to set-up the two crimpers so as to exert a proper amount of force against these different thickness regions of the end seals. Although it is known to form the crimpers with bowed or recessed areas to accommodate the larger thickness region, such crimpers are more expensive and still suffer from the other drawbacks mentioned above. Thus, it would be desirable to provide an improved structure for a crimper assembly that addresses all of these drawbacks.

SUMMARY OF THE INVENTION

This invention pertains to an improved crimper assembly for forming end seals in overlapping portions of the sheet of packaging material after being folded about an article. The crimper assembly includes a crimper including a base, an insert that is formed from a resilient material, and a support plate that is formed from a rigid material. The insert has a surface that is adapted to engage and seal overlapping layers of a packaging material. The insert is disposed between the base and the support plate. The support plate is secured to the body to retain and support the insert thereon. The insert and the support plate may be formed as separate pieces or may be secured together as a single piece. To prevent excessive compression of the insert, the insert can have an aperture formed therethrough, and the support plate can have a protrusion formed thereon that extends through the aperture into abutment with the base. Alternatively, the insert can include a pair of bushings, and such bushings are engaged between the base and the support plate to prevent excessive compression.

Various objects and advantages of this invention will become apparent to those skilled in the art from the following detailed description of the preferred embodiments, when read in light of the accompanying drawings.

BRIEF DESCRIPTION OF THE DRAWINGS

FIG. 6 is a side elevational view, partially in cross section, of the assembled crimper illustrated in FIG. 5 shown mounted on a crimper bar.

FIG. 7 is a top plan view of the assembled crimper and crimper bar illustrated in FIG. 6.

FIG. 8 is a sectional elevational view of the assembled crimper and crimper bar illustrated in FIGS. 6 and 7.

DETAILED DESCRIPTION OF THE PREFERRED EMBODIMENTS

Figure 1:
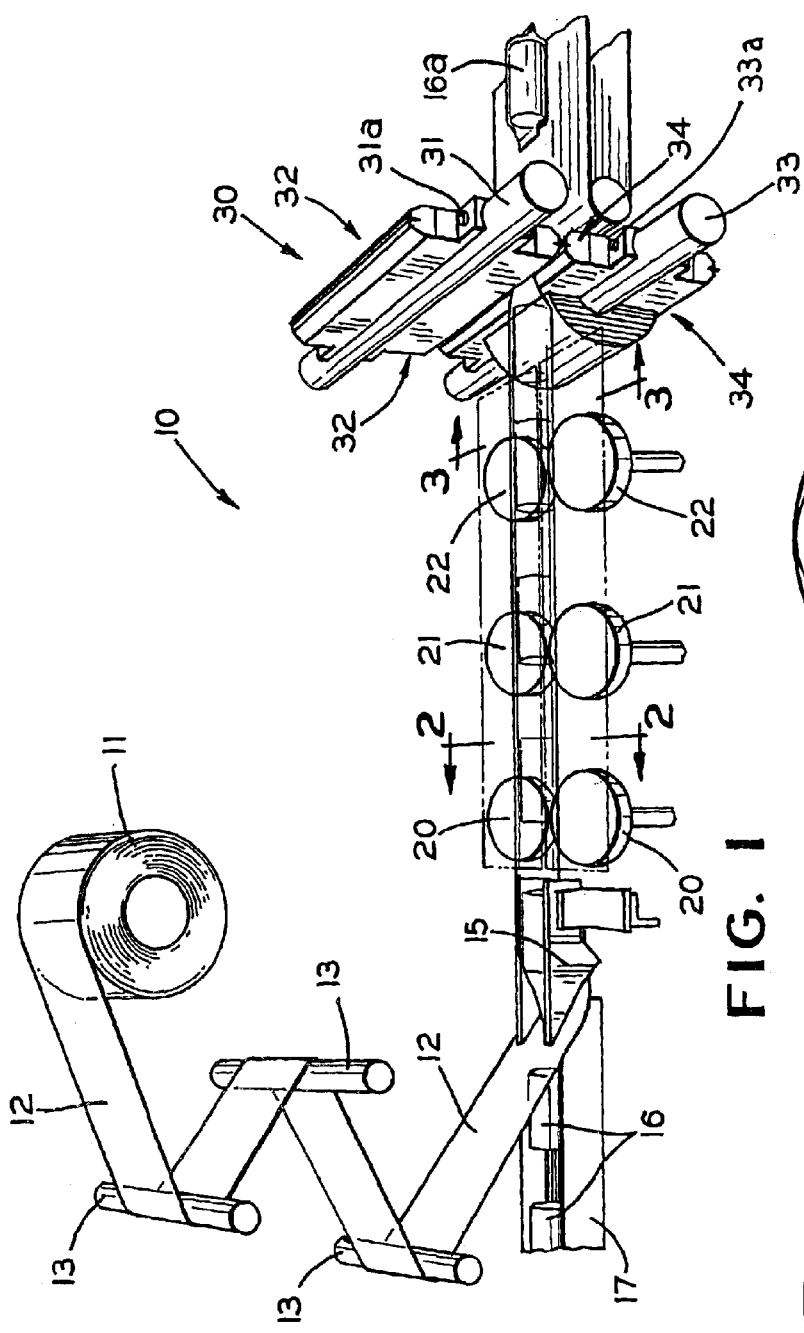
FIG. 1 is a schematic perspective view of a form, fill, and seal apparatus for packaging articles including a rotary crimper assembly in accordance with this invention.

Referring to the drawings, there is schematically illustrated in FIG. 1 a form, fill, and seal apparatus, indicated generally at 10, in accordance with this invention. The apparatus 10 is generally conventional in the art, and only those portions that are necessary for a complete understanding of this invention will be explained. The apparatus 10 includes means for supporting a roll 11 of a sheet 12 of conventional packaging material, such as a polypropylene film, a saran film, or a lamination of a plurality of films. The sheet 12 of the packaging material is payed out from the roll 11 and fed around various rollers 13 to a folding shoe 15. The folding shoe 15 is conventional in the art and is provided to continuously fold the longitudinal edges of the sheet 12 of packaging material about the sides of a plurality of articles 16 that are moved longitudinally along a conveyor 17. The folded sheet 12 of packaging material is then moved along a support surface 18.

Figure 2:
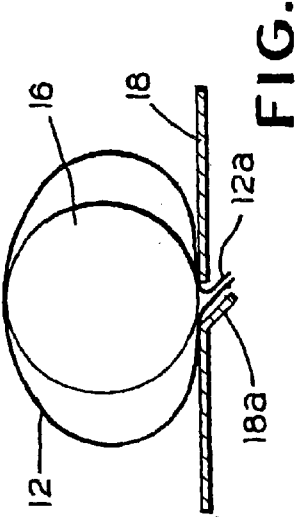
FIG. 2 is an enlarged sectional elevational view of a portion of the form, fill, and seal apparatus taken along line 2—2 of FIG. 1, showing the sheet of film partially wrapped about an article.
Figure 3:
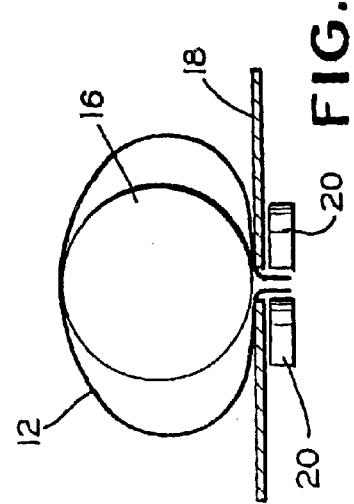
FIG. 3 is an enlarged sectional elevational view of a portion of the form, fill, and seal apparatus taken along line 3—3 of FIG. 1, showing the sheet of film fully wrapped about the article, but prior to being sealed and cut into individually sealed packages.

As the folded longitudinal edges of the sheet 12 are moved along the support surface 18, they are engaged by a pair of folding rollers 20 disposed beneath the support surface 18, as shown in FIG. 2. As a result, the longitudinal edges of the sheet 12 of packaging material are further folded downwardly in an overlapping manner. Then, a pair of grooved heat seal rollers 21 disposed beneath the support surface 18 engage the overlapping, edges of the sheet 12 of packaging material so as to create a continuous longitudinal fin seal 12a (see FIG. 3). The fin seal 12a is next engaged by a pair of pull rollers 22, also disposed beneath the support surface 18, which advance the folded sheet 12 of packaging material (and the articles 16 enclosed therein) through the apparatus 10. A deflector 18a is provided in the support surface 18 to fold the fin seal 12a upwardly into flush engagement with the folded sheet of packaging material, as shown in FIG. 3.

A rotary crimping assembly, indicated generally at 30, is provided in the apparatus 10 for laterally crimping and cutting the folded sheet 12 of packaging material so as to form a plurality of individually sealed packages, such as shown at 16a in FIG. 1. The crimping assembly 30 includes an upper crimper bar 31 that is disposed above the support surface 18 for rotation about an axis extending generally perpendicular to the longitudinal movement of the sheet 12 of packaging material. A pair of upper crimpers, indicated generally at 32, are secured to opposite sides of the upper crimper bar 31 for rotation therewith, such as by threaded fasteners 31a. The structure of one of the upper crimpers 32 will be described in detail below. Similarly, the crimping assembly 30 includes a lower crimper bar 33 that is disposed below the support surface 18 for rotation about an axis extending generally perpendicular to the longitudinal movement of the sheet 12 of packaging material. A pair of lower crimpers, indicated generally at 34, are secured to opposite sides of the lower crimper bar 33 for rotation therewith, such as by threaded fasteners 33a. The structures of the lower crimpers 34 can be the same as the structures of the upper crimpers 34 or may vary as desired.

Referring now to FIGS. 4 through 7, the structure of one of the upper crimpers 32 is illustrated in detail. As shown therein, the illustrated upper crimper 32 includes a base, indicated generally at 40, that is preferably formed form a strong, rigid material, such as steel. The illustrated base 40 includes an inwardly facing mounting surface 41, an outwardly facing crimping surface 42, and a pair of laterally extending side surfaces 43 and 44. In the illustrated embodiment, the inwardly facing mounting surface 41 of the base 40 is generally concave and arcuate in shape and is adapted to abut a correspondingly shaped mounting surface (not shown) formed on a portion of the upper crimper bar 31. To accomplish this, the base 40 may have a pair of laterally extending mounting ears 45 formed integrally therewith or otherwise provided thereon. The mounting ears 45 have respective apertures 45a formed therethrough that are adapted to receive the threaded fasteners 31a. Such threaded fasteners 31a extend through the apertures 45a into threaded engagement with respective threaded bores (not shown) formed in the upper crimper bar 31 to retain the base 40 thereon.

The outwardly facing surface 42 of the base 40 has a laterally extending slot 42a formed therein. The slot 42a is adapted to receive a conventional knife (not shown) therein for cutting the folded sheet 12 of packaging material so as to form the plurality of individually sealed packages 16a as discussed above. The knife can be retained in the slot 42a by a pair of threaded fasteners 42b that are supported on the opposed lateral ends of the base 40. When the threaded fasteners 42b are tightened, they engage the opposed ends of the knife to retain it within the slot 42a. If desired, portions 42c of the outwardly facing surface 42 of the base 40 can be formed having an undulating shape, although such is not required.

The laterally extending side surfaces 43 and 44 of the base 40 have respective recesses 43a and 44a formed therein. The recesses 43a and 44a preferably have a lateral width that is at least as large as the lateral width of the folded sheet 12 of packaging material that will be crimped and cut by the crimping assembly 30, as described above. The illustrated recesses 43a and 44a are generally U-shaped, each having a pair of opposed side surfaces and a bottom surface, although such is not required. A first pair of threaded bores 43b are formed in the base 40, extending inwardly from the first recess 43a formed in the first laterally extending side 43. Similarly, a second pair of threaded bores 44b (only one is illustrated) are formed in the base 40, extending inwardly from the second recess 44a formed in the second laterally extending side 44. As best shown in FIGS. 6 and 7, the first pair of threaded bores 43b and the second pair of bores 44b are preferably laterally offset from one another. The purpose for these threaded bores 43b and 44b will be explained below.

The upper crimper 32 also includes a pair of crimping inserts 46 and 47 that are adapted to be supported on the base 40. The crimping inserts 46 and 47 are preferably sized to be slightly smaller than the recesses 43a and 44a formed in the laterally extending sides 43 and 44, respectively, formed in the base 40. Thus, the crimping inserts 46 and 47 can be easily received within such recesses 43a and 44a, yet are engaged and supported by the opposed side surfaces and the bottom surface of the recesses 43a and 44a. Each of the crimping inserts 46 and 47 is preferably formed from a relatively resilient material that is suitable for compressing overlapping portions of the folded sheet 12 of packaging material to form an intermeshing seal pattern, as will be described in detail below. The specific material used to form the crimping inserts 46 and 47 can vary from application to application. For cold sealing applications, for example, the crimping inserts 46 and 47 may be formed from a resilient polyurethane material, such as ether or ester. For heat sealing applications, for example, the crimping inserts 46 and 47 may be formed from a synthetic rubber material, such as EPDM or VITON (a fluoroelastomer based on a copolymer of vinylidene fluoride and hexafluoroproplyene). Preferably, the crimping inserts 46 and 47 have a durometer hardness in the range of from about sixty to about one hundred ten, and preferably within the range of from about seventy-five to about ninety-five.

The outwardly facing portions of each of the crimping inserts 46 and 47 are formed having respective laterally longitudinally extending crimping surfaces 46a and 47a. As best shown in FIGS. 4 through 8, the resilient crimping surfaces 46a and 47a may be formed having a generally undulating cross sectional shape. This undulating shape is preferable for use with the illustrated rotary crimping assembly 30. However, the resilient crimping surfaces 46a and 47a may be formed having any desired shape or shapes. The purpose for these resilient crimping surfaces 46a and 47a will be explained below. Each of the crimping inserts 46 and 47 also has a pair of openings 46b and 47b (see FIG. 10 for the openings 47b) respectively formed therethrough. Preferably, the openings 46b formed through the first crimping insert 46 disposed in the first recess 43 are aligned with the threaded bores 43b. Similarly, the openings 47b formed through the second crimping insert 47 disposed in the second recess 44 are aligned with the threaded bores 44b. The purpose for these openings 46b and 47b will also be explained below.

The upper crimper 32 further includes a pair of support plates 48 and 49 for respectively retaining the crimping inserts 46 and 47 in the first and second recesses 43 and 44 of the base 40. Each of the support plates 48 and 49 is preferably formed from a strong, rigid material, such as steel. The support plates 48 and 49 are preferably sized to be slightly smaller than the recesses 43a and 44a formed in the laterally extending sides 43 and 44, respectively, formed in the base 40. Thus, the support plates 48 and 49 can be easily received within such recesses 43a and 44a adjacent to the crimping inserts 46 and 47. However, it is not necessary that the support plates 48 and 49 be received within the recesses 43a and 44a. Each of the support plates 48 and 49 has a pair of openings 48a and 49a (see FIG. 10 for the openings 49a) respectively formed therethrough. Preferably, the openings 48a formed through the first support plate 48 are aligned with the openings 46b formed through the first crimping insert 46 and the threaded bores 43b. Similarly, the openings 49a formed through the second support plate 49 are aligned with the openings 47b formed through the second crimping insert 47 and the threaded bores 44b. The purpose for these openings 48a and 49a will also be explained below.

The upper crimper 32 is assembled by initially disposing the crimping inserts 46 and 47 respectively within the recesses 43a and 44a formed in the laterally extending sides 43 and 44 of the base 40. Then, the support plates 48 and 49 are disposed within the recesses 43a and 44a adjacent to the crimping inserts 43 and 44, respectively. Lastly, the crimping inserts 46 and 47 and the support plates 48 and 49 are retained on the base 40 by means of respective pairs of threaded fasteners 48b and 49b. The first threaded fasteners 48b extend respectively through the openings 48a formed through the first support plate 48 and through the aligned openings 46b formed through the first crimping insert 46 into threaded engagement with the threaded bores 43b formed in the base 40. Similarly, the second threaded fasteners 49b extend respectively through the openings 49a formed through the second support plate 49 and through the aligned openings 47b formed through the second crimping insert 47 into threaded engagement with the threaded bores 44b formed in the base 40. In this manner, the crimping inserts 46 and 47 are secured to the upper crimper 32 for use in the rotary crimping assembly 30.

As mentioned above, the first pair of threaded bores 43b and the second pair of bores 44b are preferably laterally offset from one another. This is done for two reasons. First, this offset provides lateral clearance for the threaded bores 43b and 44b so that they do not interfere with one another. Second, and perhaps more important, this lateral offset causes the openings 46b and 47b formed respectively through the inserts 46 and 47 to be located non-symmetrically relative to respectively centerlines passing therethrough, as best shown in FIGS. 6 and 7. Consequently, the inserts 46 and 47 can only be installed within the recesses 43a and 44b in predetermined orientations, wherein first faces of the inserts 46 and 47 engage the laterally extending sides 43 and 44 of the base 40 and second faces of the inserts 46 and 47 engage the support plates 48 and 49, as best shown in FIG. 8. If, for example, it is attempted to install the insert 46 in a reverse orientation, wherein the first face of the insert 46 engages the support plate 48 and the second face of the insert 46 engages the laterally extending side 43 of the base 40, the openings 46b formed through the insert 46 will not be aligned with the threaded bores 43b formed in the base 40. This predetermined orientation can be important, such as when the inserts 46 and 47 are circumferentially tapered (see FIG. 8) for use in the illustrated rotary crimping assembly 30.

The lower crimper 34 may be formed in the same manner as the upper crimper 32. Alternatively, the lower crimper 34 may be formed exclusively form a strong, rigid material, such as high strength steel, having the same general shape as the upper crimper 32. In this instance, the outwardly facing surface of the lower crimper 34 is formed having an undulating cross sectional shape that corresponds to the undulating cross sectional shape of the crimping surfaces 46a and 47a of the crimping inserts 46 and 47. If the upper crimper 32 is provided with the knife as described above, then the lower crimper 34 may have a similar slot (not shown) formed therein to receive a conventional anvil therein. The knife and the anvil cooperate in a known manner to facilitate the cutting of the folded sheet 12 of packaging material so as to form the plurality of individually sealed packages 16a as discussed above.

The operation of the crimper assembly 30 is disclosed in detail in U.S. Pat. No. 6,230,781, the disclosure of which is incorporated herein by reference. Briefly, however, as the folded sheet 12 of packaging material is moved along the support surface 18 through the rotary crimping assembly 30, the first and second crimpers 32 and 34 are each rotated about an axis that generally passes through the centerline of each of the first and second crimper bars 31 and 33. As a result, the leading edges of the first and second crimpers 32 and 34 initially engage the folded sheet 12 of packaging material. When this occurs, the folded sheet 12 of packaging material is compressed between the resilient crimping surface 46a of the upper crimper 32 and the rigid crimping surface of the lower crimper 34. As a result, the overlapping layers that make up the folded sheet 12 of packaging material are sealed together to form a trailing edge seal for a packaged article 16.

Further movement of the folded sheet 12 of packaging material and rotation of the first crimper 32 relative to the second crimper 34 rotates the knife to a position where it is aligned with the anvil. Consequently, the folded sheet 12 of packaging material is cut longitudinally into two pieces. Still further movement of the folded sheet 12 of packaging material and rotation of the first and second crimpers 32 and 34, respectively, causes the trailing edges of the first and second crimpers 32 and 34 to engage the folded sheet 12 of packaging material to compress the folded sheet 12 of packaging material between the resilient crimping surface 47a of the upper crimper 32 and the rigid crimping surface of the lower crimper 34. As a result, the overlapping layers that make up the folded sheet 12 of packaging material are sealed together to form a leading edge seal for the next packaged article 16 on the conveyor 17.

Preferably, the first and second crimpers 32 and 34 are arranged such that the resilient inserts 46 and 47 are within the range of from about 85% to about 95% of their uncompressed thickness when rotated about the first crimper bar 31 and engaged with the second rigid crimping surface. The resiliency of the resilient insert 50 allows the crimping assembly 30 to accommodate wrinkles and variations in the thickness of the sheet 12 of packaging material, while insuring the formation of a secure seal. The inserts 46 and 47 can be easily removed for inspection and replacement without requiring removal of the upper crimper 32 from the crimper bar 31, which would entail a time consuming repeat of the set-up process for the crimpers 32 and 34 on the crimping assembly 30, as described above. Thus, when the inserts 46 and 47 become worn after a period of use, they can be quickly and easily replaced.

Figure 4:
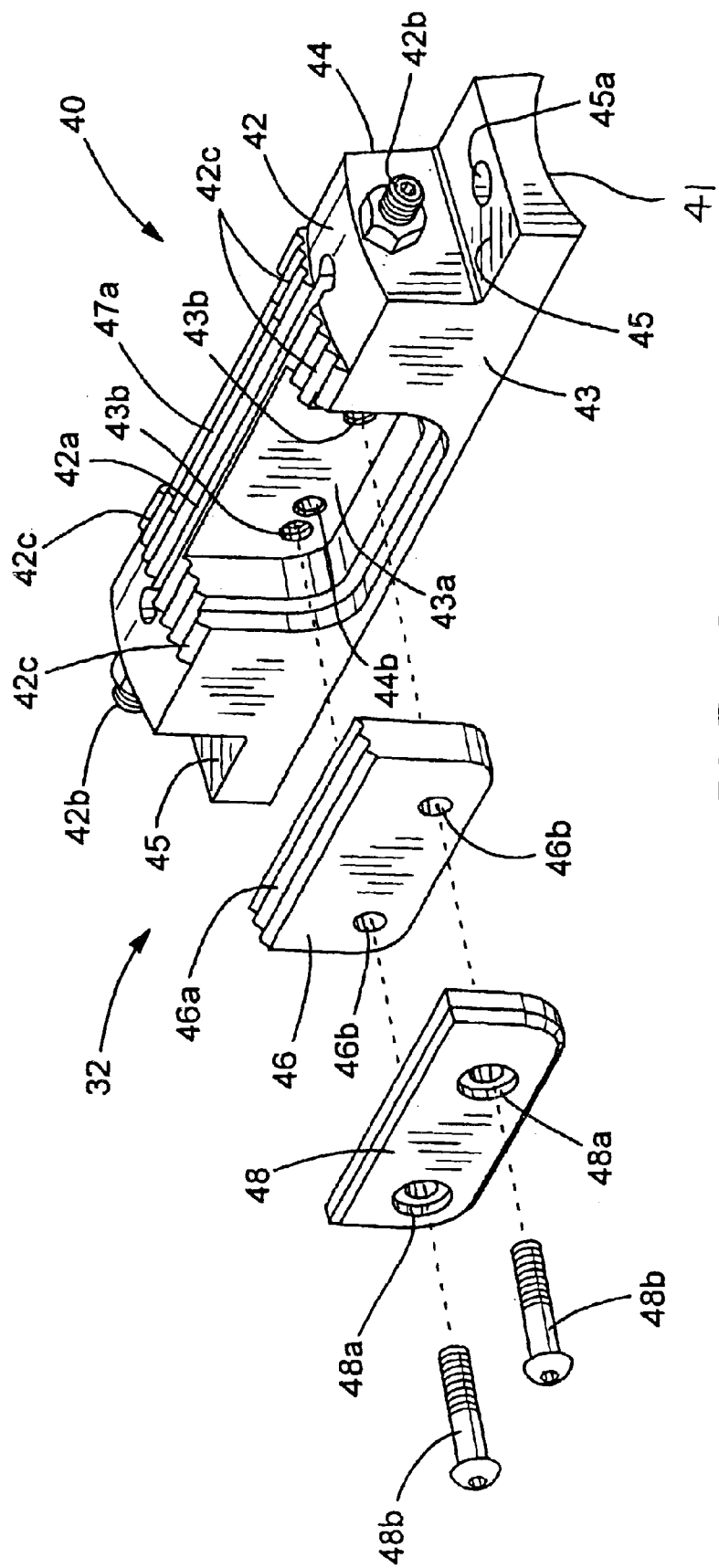
FIG. 4 is an exploded perspective view of a first embodiment of one of the crimpers of the rotary crimping assembly illustrated in FIG. 1.
Figure 5:
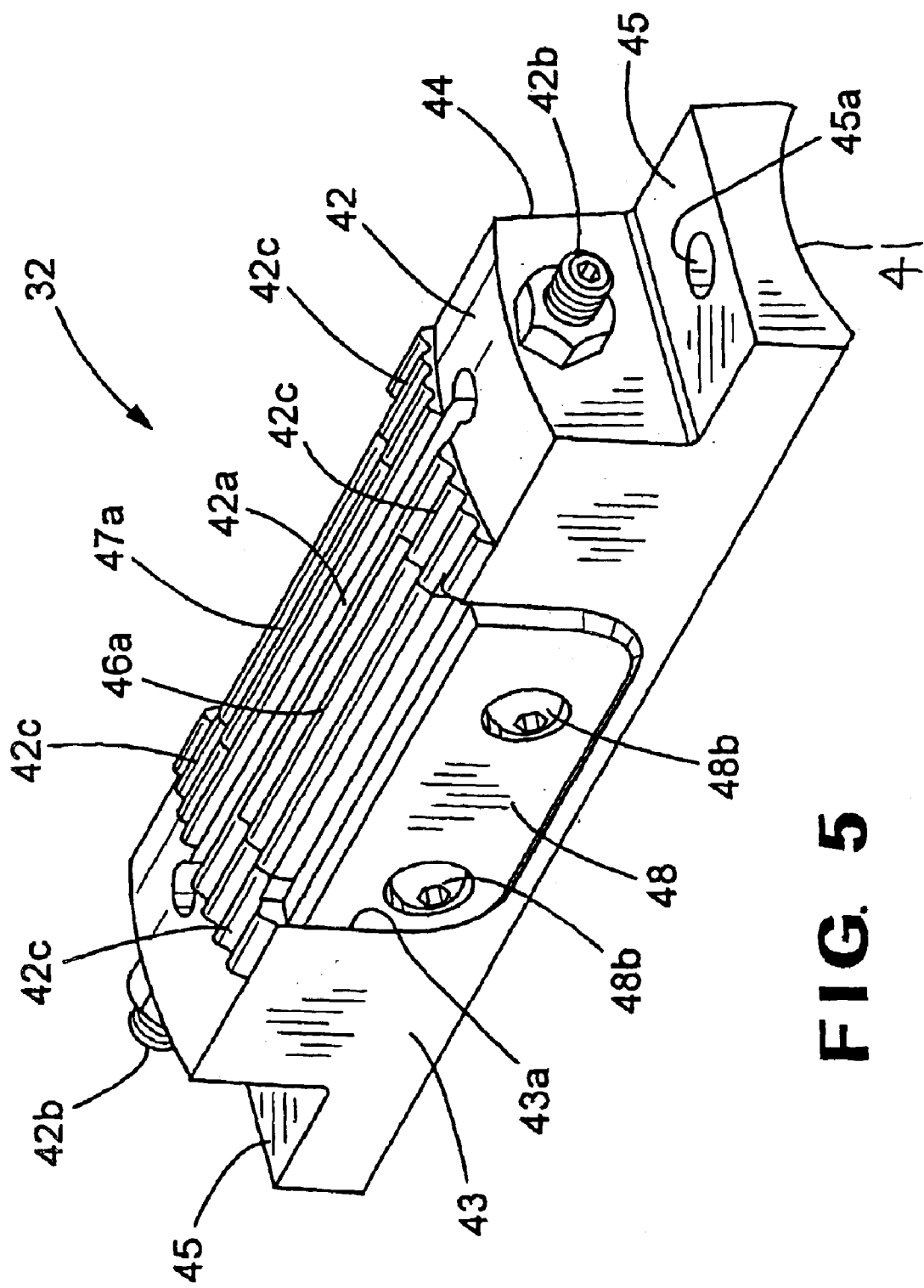
FIG. 5 is a perspective view of the crimper illustrated in FIG. 4 shown assembled.
Figure 9:
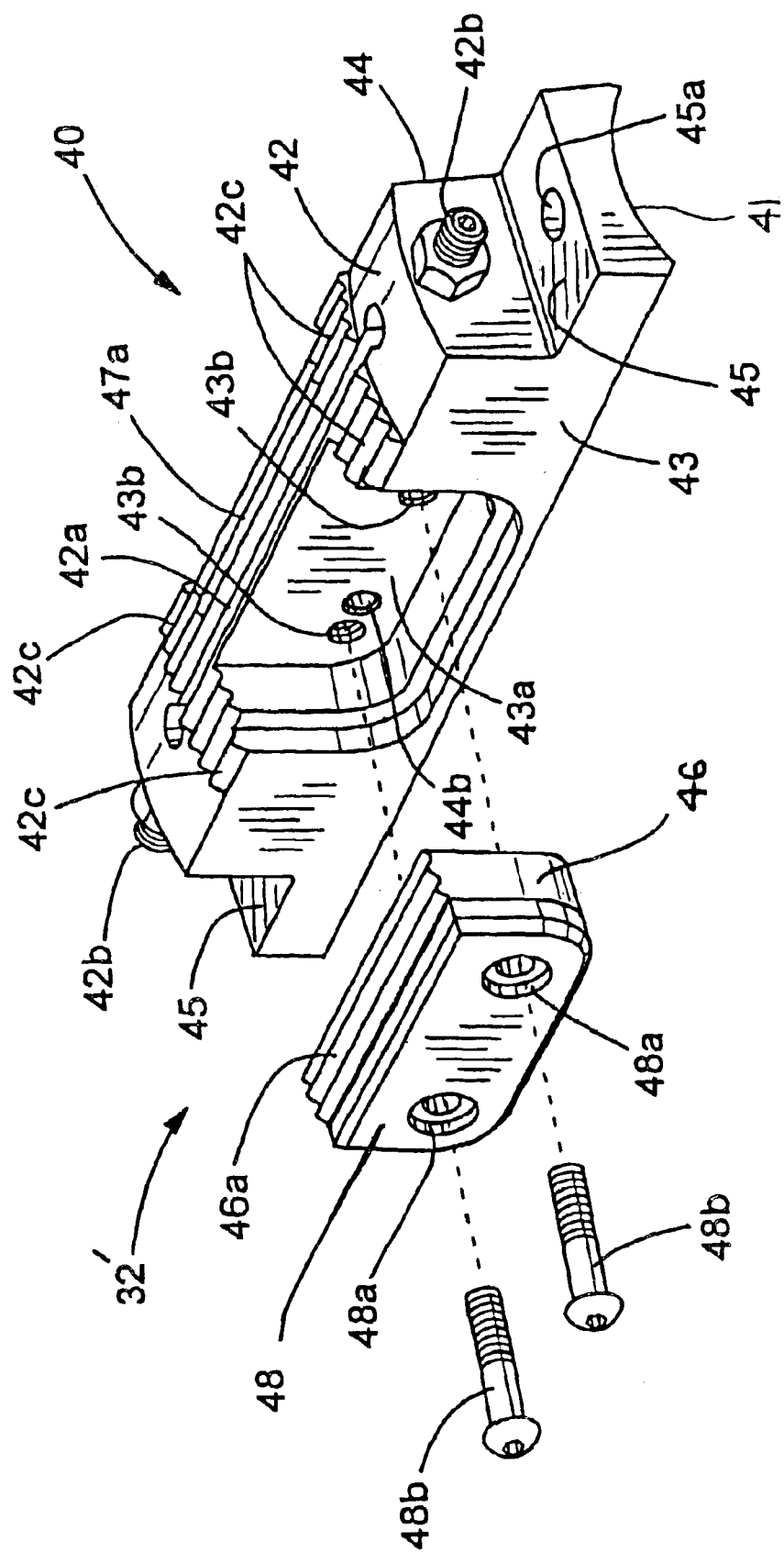
FIG. 9 is an exploded perspective view similar to FIG. 4 of a second embodiment of one of the crimpers of the rotary crimping assembly illustrated in FIG. 1.

FIG. 9 is a perspective view similar to FIG. 4 that illustrates a second embodiment of one of the crimpers, indicated generally at 32', of the rotary crimping assembly 30 illustrated in FIG. 1. The second embodiment of the crimper 32' is generally similar to the first embodiment 32, and like reference numbers are used to identify similar components. In the second embodiment of the crimper 32', the crimping inserts 46 and 47 are respectively bonded or otherwise secured to their support plates 48 and 49. The securement of the crimping inserts 46 and 47 to the support plates 48 and 49, respectively, facilitates the installation and replacement thereof by reducing the number of parts that are required to be handled. Otherwise, the crimping inserts 46 and 47, the support plates 48 and 49, and the remaining components of the crimper 32' are identical in structure and operation to the components of the crimper 32 described above.

Figure 10:
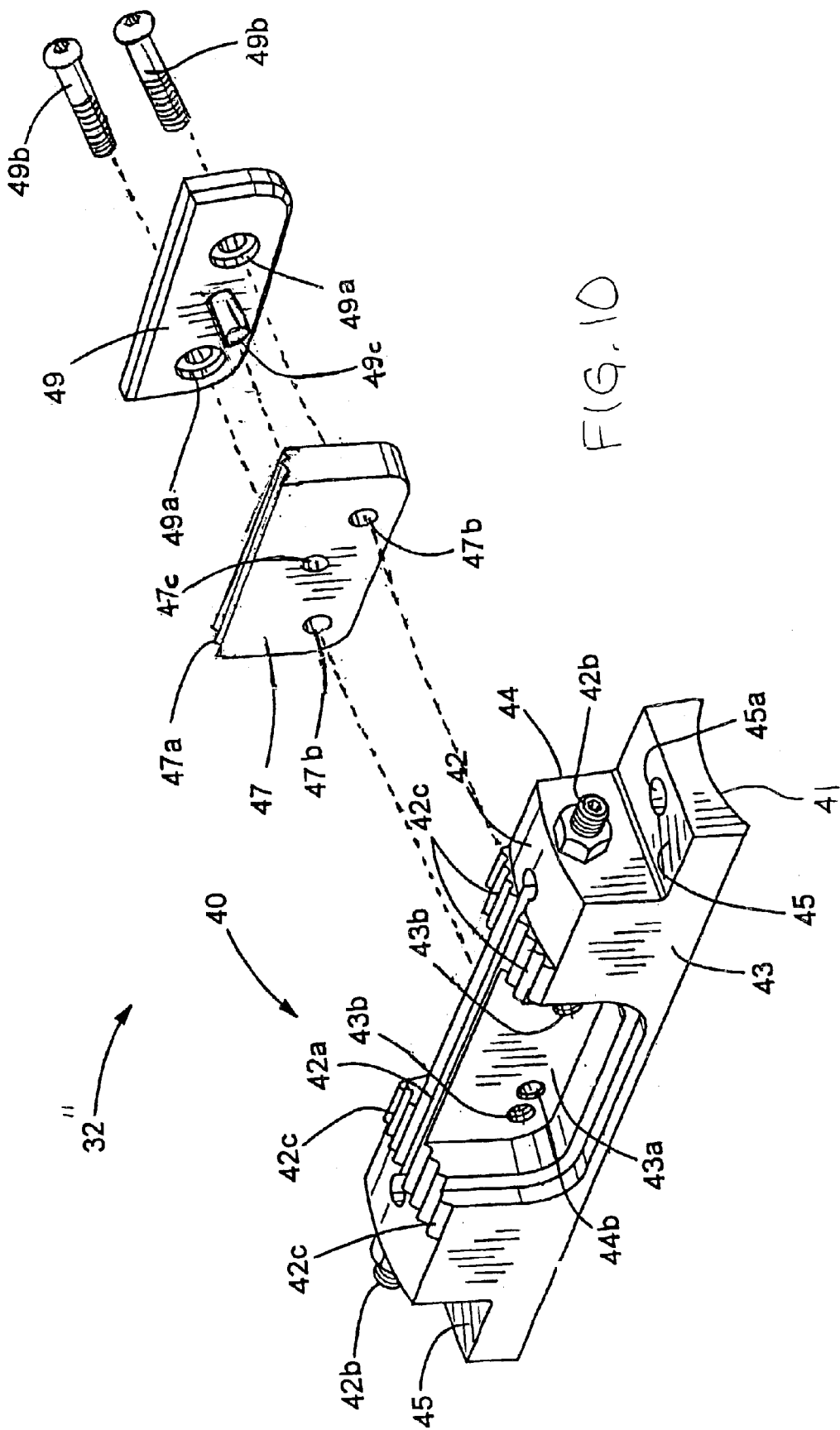
FIG. 10 is an exploded perspective view similar to FIG. 4 of a third embodiment of one of the crimpers of the rotary crimping assembly illustrated in FIG. 1.
Figure 11:
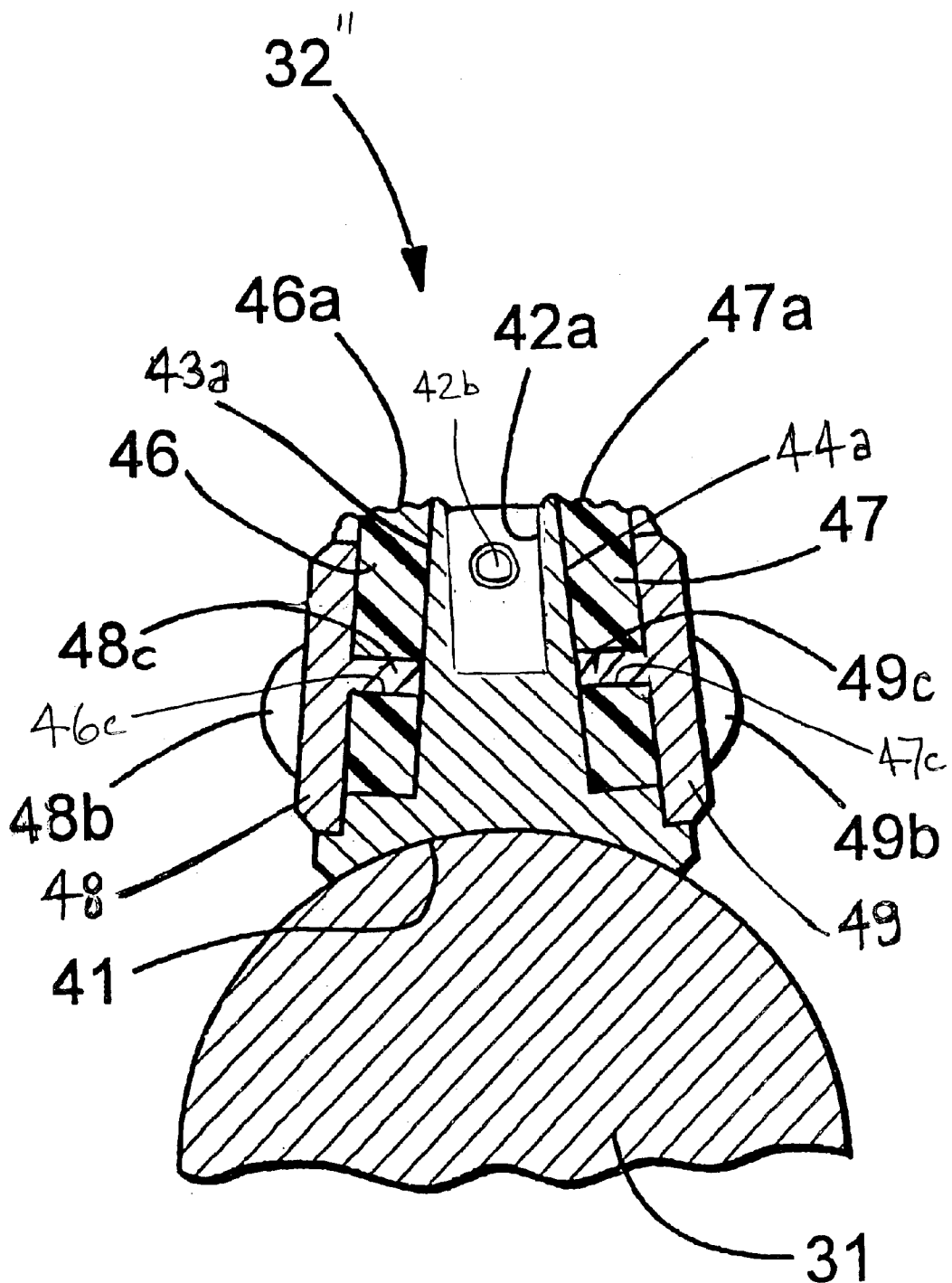
FIG. 11 is an enlarged sectional elevational view of the assembled crimper and crimper bar illustrated in FIG. 10 shown mounted on a crimper bar.

FIG. 10 is a perspective view similar to FIG. 4 that illustrates a third embodiment of one of the crimpers, indicated generally at 32", of the rotary crimping assembly 30 illustrated in FIG. 1. The third embodiment of the crimper 32" is generally similar to the first embodiment 32, and like reference numbers are used to identify similar components. In the third embodiment of the crimper 32", the crimping inserts 46 and 47 have respective apertures 46c (see FIG. 11) and 47c formed therethrough. Also, in the third embodiment of the crimper 32", the support plates 48 and 49 have respective protrusions 48c (see FIG. 10) and 49c formed or otherwise provided thereon. The third embodiment of the upper crimper 32" is assembled by initially disposing the crimping inserts 46 and 47 respectively within the recesses 43a and 44a formed in the laterally extending sides 43 and 44 of the base 40. Then, the support plates 48 and 49 are disposed within the recesses 43a and 44a adjacent to the crimping inserts 43 and 44, respectively. In doing so, the protrusion 48c provided on the support plate 48 extends through the aperture 46c formed through the crimping insert 46 and into abutment with the inner surface of the recess 43a formed in the laterally extending side surface 43 of the upper crimper 32". Similarly, the protrusion 49c provided on the support plate 49 extends through the aperture 47c formed through the crimping insert 47 and into abutment with the inner surface of the recess 44a formed in the laterally extending side surface 44 of the upper crimper 32". Lastly, the crimping inserts 46 and 47 and the support plates 48 and 49 are secured to the base 40 by means of the respective pairs of threaded fasteners 48b and 49b. Thus, the crimping inserts 46 and 47 are secured to the upper crimper 32" for use in the rotary crimping assembly 30. As best shown in FIG. 1, the abutments of the protrusions 48c and 49c with the inner surfaces of the recess 43a and 44a prevents the crimping inserts 46 and 47 from being excessively compressed by the support plates 48 and 49 when the threaded fasteners 48b and 49b are tightened. Otherwise, the crimping inserts 46 and 47, the support plates 48 and 49, and the remaining components of the third embodiment of the crimper 32" are identical in structure and operation to the components of the crimper 32 described above.

Figure 12:
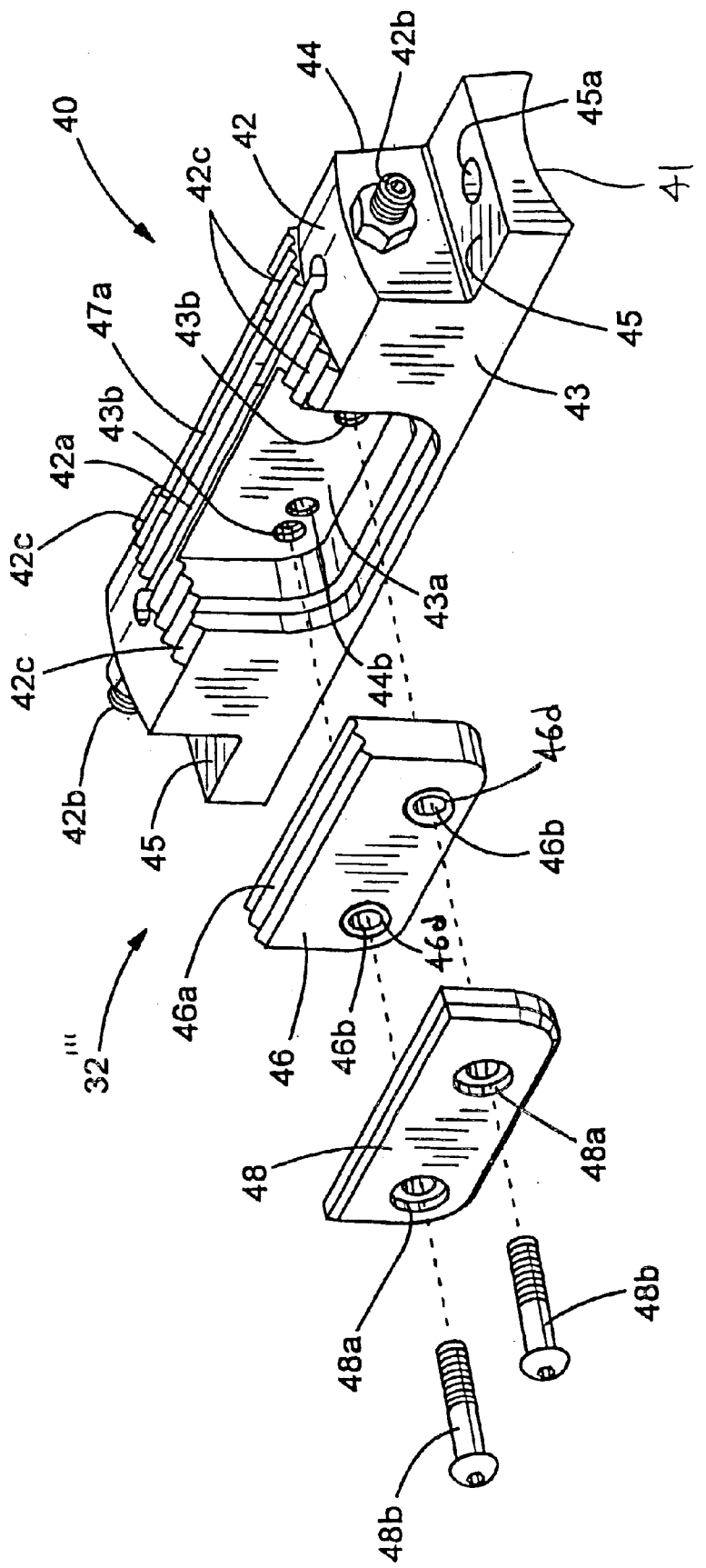
FIG. 12 is an exploded perspective view similar to FIG. 4 of a fourth embodiment of one of the crimpers of the rotary crimping assembly illustrated in FIG. 1.
Figure 13:
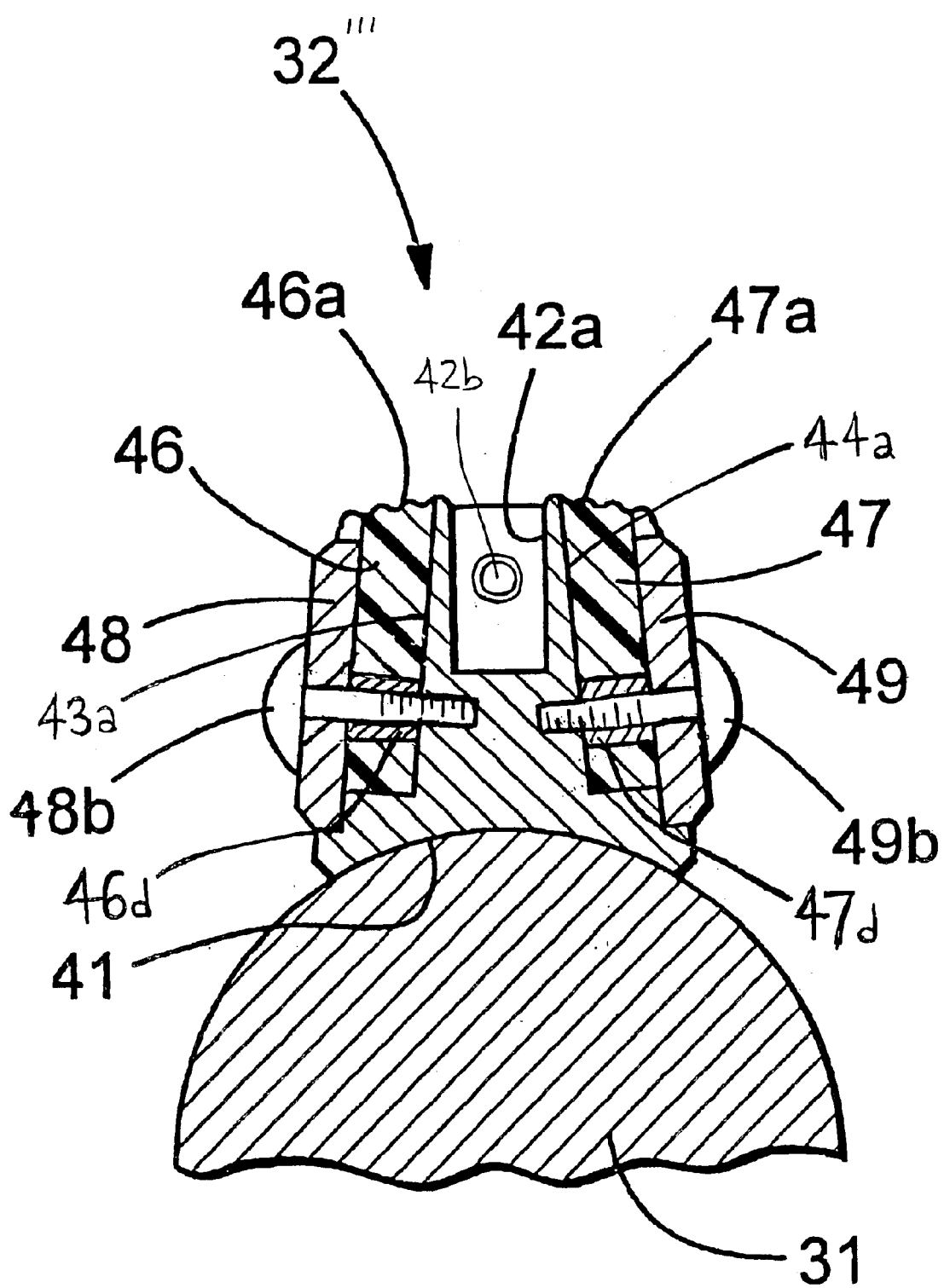
FIG. 13 is an enlarged sectional elevational view of the assembled crimper and crimper bar illustrated in FIG. 12 shown mounted on a crimper bar.

FIG. 12 is a perspective view similar to FIG. 4 that illustrates a fourth embodiment of one of the crimpers, indicated generally at 32''', of the rotary crimping assembly 30 illustrated in FIG. 1. The fourth embodiment of the crimper 32''' is generally similar to the first embodiment 32, and like reference numbers are used to identify similar components. In the fourth embodiment of the crimper 32''', the crimping insert 46 has a pair of bushings 46d disposed within the pair of openings 46b formed therethrough. Similarly, the crimping insert 47 has a pair of bushings 47d (see FIG. 13) disposed within the pair of openings 47b formed therethrough. The fourth embodiment of the upper crimper 32''' is assembled by initially disposing the crimping inserts 46 and 47 respectively within the recesses 43a and 44a formed in the laterally extending sides 43 and 44 of the base 40. Then, the support plates 48 and 49 are disposed within the recesses 43a and 44a adjacent to the crimping inserts 43 and 44, respectively. Lastly, the crimping inserts 46 and 47 and the support plates 48 and 49 are secured to the base 40 by means of the respective pairs of threaded fasteners 48b and 49b. Thus, the crimping inserts 46 and 47 are secured to the upper crimper 32'' for use in the rotary crimping assembly 30. As best shown in FIG. 13, the pairs of bushings 46d and 47d are compressed between the support plates 48 and 49 and the inner surfaces of the recesses 43a and 44a to prevent the crimping inserts 46 and 47 from being excessively compressed by the support plates 48 and 49 when the threaded fasteners 48b and 49b are tightened. Otherwise, the crimping inserts 46 and 47, the support plates 48 and 49, and the remaining components of the fourth embodiment of the crimper 32''' are identical in structure and operation to the components of the crimper 32 described above.

In accordance with the provisions of the patent statutes, the principle and mode of operation of this invention have been described in its preferred embodiments. However, it should be noted that this invention may be practiced otherwise than as specifically illustrated and described without departing from its scope. For example, the crimpers of this invention have been described and illustrated in the context of an otherwise conventional rotary crimping assembly. It will be appreciated, however, that the crimpers of this invention may be utilized in other types of conventional crimping assemblies, such as walking bar and intermittent crimping assemblies, wherein one or both of the crimpers are moved in such a manner as to engage and compress the packaging material therebetween.

What is claimed is:

1. A crimper adapted for use in a crimper assembly for engaging and sealing overlapping layers of a packaging material comprising:

a base;

an insert formed from a resilient material, said insert having a surface that is adapted to engage and seal overlapping layers of a packaging material; and a support plate formed from a rigid material, said insert being disposed between said base and said support plate, said support plate being secured to said body to retain and support said insert thereon.

2. The crimper defined in claim 1 wherein said base has a recess formed therein, and wherein said insert is disposed within said recess.

3. The crimper defined in claim 1 wherein said insert and said support plate are separate pieces.

4. The crimper defined in claim 1 wherein said insert and said support plate are secured together as a single piece.

5. The crimper defined in claim 1 wherein said support plate has a protrusion formed thereon that abuts said base.

6. The crimper defined in claim 5 wherein said insert has an aperture formed therethrough, and wherein said protrusion on said support plate extends through said aperture.

7. The crimper defined in claim 1 wherein said insert includes a bushing, and wherein said bushing is engaged between said base and said support plate.

8. The crimper defined in claim 7 further including a threaded fastener for securing said support plate to said body, and wherein said threaded fastener extends through said bushing.

9. The crimper defined in claim 1 wherein said insert includes a pair of bushings, and wherein said bushings are engaged between said base and said support plate.

10. The crimper defined in claim 7 further including a pair of threaded fasteners for securing said support plate to said body, and wherein said threaded fasteners respective extend through said bushings.

* * * * *

UNITED STATES PATENT AND TRADEMARK OFFICE
CERTIFICATE OF CORRECTION

PATENT NO. : 6,736,182 B2 Page 1 of 1
DATED : May 18, 2004
INVENTOR(S) : Larry E. Smith and Louis M. Montano It is certified that error appears in the above-identified patent and that said Letters Patent is hereby corrected as shown below:

<u>Column 10,</u>
Line 12, delete "body" and insert -- base --

Signed and Sealed this

Thirtieth Day of November, 2004

JON W. DUDAS
*Director of the United States Patent and Trademark Office*